(12) United States Patent
Wilson (10) Patent No.: US 8,322,360 B2
(45) Date of Patent: Dec. 4, 2012

(54) RUPTURE PANEL

(75) Inventor: Alan Wilson, Coweta, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 287 days.

(21) Appl. No.: 12/852,975

(22) Filed: Aug. 9, 2010

(65) Prior Publication Data

US 2011/0303665 A1    Dec. 15, 2011

Related U.S. Application Data

(60) Provisional application No. 61/232,229, filed on Aug. 7, 2009.

(51) Int. Cl.
*F16K 17/16* (2006.01)
*F16K 17/40* (2006.01)

(52) U.S. Cl. ............... 137/68.23; 137/68.27; 137/68.19; 220/89.1; 220/89.2

(58) Field of Classification Search .......... 52/1, 98–100, 52/202, 208; 220/89.1, 89.2, 89.3; 137/68.22, 137/68.23, 68.25, 68.27, 68.28, 68.11, 68.19, 137/70
See application file for complete search history.

(56) References Cited

U.S. PATENT DOCUMENTS

| | | | | |
|---|---|---|---|---|
| 2,358,143 A * | 9/1944 | Castor | ............................. | 52/100 |
| 2,947,443 A * | 8/1960 | Landeg et al. | ............... | 220/89.2 |
| 2,980,286 A * | 4/1961 | Coffman | ...................... | 220/89.2 |
| 3,445,032 A * | 5/1969 | Hansen et al. | ............... | 220/89.2 |
| 3,464,585 A * | 9/1969 | Summers | ..................... | 220/89.2 |
| 3,881,629 A * | 5/1975 | Shaw et al. | ................... | 220/89.2 |
| 4,067,154 A * | 1/1978 | Fike, Jr. | ............................. | 52/99 |
| 4,434,905 A * | 3/1984 | Ou et al. | ....................... | 220/89.2 |
| 4,498,261 A * | 2/1985 | Wilson et al. | ....................... | 52/1 |
| 4,612,739 A * | 9/1986 | Wilson | ................................ | 52/1 |
| 4,656,793 A | 4/1987 | Fons | | |
| 4,662,126 A * | 5/1987 | Malcolm | ...................... | 52/167.9 |
| 4,750,303 A | 6/1988 | Mullen | | |
| 4,777,974 A * | 10/1988 | Swift et al. | ....................... | 137/14 |
| 4,787,180 A | 11/1988 | Robinson | | |
| 4,821,909 A * | 4/1989 | Hibler et al. | ............. | 220/203.08 |
| 4,905,722 A * | 3/1990 | Rooker et al. | ............. | 137/68.27 |
| 4,978,947 A * | 12/1990 | Finnegan | ..................... | 340/611 |
| 5,002,085 A * | 3/1991 | FitzGerald | ................ | 137/68.27 |
| 5,036,632 A | 8/1991 | Short | | |
| RE34,308 E * | 7/1993 | Thompson et al. | ........... | 340/679 |
| 5,482,075 A * | 1/1996 | Farwell et al. | ............. | 137/68.11 |

(Continued)

FOREIGN PATENT DOCUMENTS

EP            317702 A1 *   5/1989

(Continued)

*Primary Examiner* — Jeanette Chapman
(74) *Attorney, Agent, or Firm* — Garvey, Smith, Nehrbass & North, L.L.C.; Charles C. Garvey, Jr.; Vanessa M. D'Souza (57) ABSTRACT

A rupture panel of three layers employs a lower layer (e.g. foam) that is adhesive, a middle layer (e.g. metallic) and a hold down layer. The middle layer has a weakened portion (scoring, openings, for example) that defines the panel burst pressure. A part of the lower layer does not connect to the middle layer. That part that does not connect to the middle layer adheres to the hold down layer. The hold down layer can be in the form of a ring with an open center, the weakened portion of the middle layer occupying a position within the open center of the hold down layer.

31 Claims, 5 Drawing Sheets

U.S. PATENT DOCUMENTS

| | | | |
|---|---|---|---|
| 5,631,634 A * | 5/1997 | Strelow | 340/626 |
| 6,070,365 A | 6/2000 | Leonard | |
| 6,367,203 B1 * | 4/2002 | Graham et al. | 52/1 |
| 6,607,003 B1 * | 8/2003 | Wilson | 137/68.23 |
| 6,792,964 B2 * | 9/2004 | Farwell et al. | 137/68.25 |
| 7,017,767 B2 * | 3/2006 | Eijkelenberg et al. | 220/89.2 |
| 7,234,278 B2 * | 6/2007 | Eijkelenberg et al. | 52/99 |
| 7,556,063 B2 * | 7/2009 | Eijkelenberg et al. | 137/797 |
| 7,628,167 B2 * | 12/2009 | Eijkelenberg et al. | 137/68.23 |
| 2004/0172889 A1 * | 9/2004 | Eijkelenberg et al. | 52/99 |
| 2005/0235584 A1 * | 10/2005 | Farwell | 52/202 |
| 2007/0234655 A1 * | 10/2007 | Jakus et al. | 52/202 |
| 2008/0041454 A1 * | 2/2008 | Eijkelenberg et al. | 137/68.23 |
| 2008/0041473 A1 * | 2/2008 | Eijkelenberg et al. | 137/797 |

FOREIGN PATENT DOCUMENTS

EP    0442199 A2    8/1991

\* cited by examiner

RUPTURE PANEL

CROSS-REFERENCE TO RELATED APPLICATIONS

Priority of U.S. Provisional Patent Application Ser. No. 61/232,229, filed 7 Aug. 2009, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to rupture disks and panels, and more particularly to an improved rupture panel arrangement. Even more particularly, the present invention relates to an improved rupture panel that features a peripheral sealing arrangement. The sealing arrangement is achieved by using a three layer construction that includes a lower seal layer of adhesive backed foam (e.g. polyethylene foam), a metal membrane layer or "top" with slits and/or holes that determine burst pressure (e.g. 316 stainless steel), and a hold down ring that is held in place by adhesive from the foam seal layer that is exposed at the perimeter or through holes in the metal membrane top.

2. General Background of the Invention

Many patents (examples follow herein) have issued that relate to rupture panels and disks. Some of these patents relate to rupture panels that include a larger, often rectangular or square (or other) shaped panel member having a peripheral frame or border that supports it. An example of such a rupture panel can be seen in the Fike U.S. Pat. No. 4,067,154. The '154 patent discloses a flexible, low-mass, non-fragmenting burst member or panel which is said to be extremely predictable and essentially instantaneous in operation, even at low burst pressures, in order to safely vent and protect pressure vessels such as bag houses or the like from the potentially catastrophic effects of internal explosions or adverse high-pressure conditions. The panel structure preferably includes a thin metallic substrate having a pattern of tape directly applied thereto, with a coating of epoxy paint over the tape pattern and substrate; sharp-breaking, shear burst lines are thereby produced along the edges of the tape pattern which ensures that the panel will instantaneously vent a pressure vessel through essentially the entire area of full vent opening, thus giving a degree of operational predictability impossible to attain with conventional burst-type venting structures.

U.S. Pat. No. 4,612,739 discloses a low pressure venting panel that acts to safely vent a pressure vessel, such as a bag house, from overpressure conditions. The venting panel is said to be particularly responsive and predictable at low pressures. The panel includes a thin rupture body with a central group of apertures and slit lines emanating from the apertures. A thin sealing membrane is bonded to one surface of the rupture body at least in the area of the slits. The characteristics of the sealing membrane are said to enable the membrane to resist expansion in the area of the slits when pressure is applied to the rupture body, thereby resisting rupture of the membrane up to the design rupture limit of the venting panel. Various aperture patterns in the center of the rupture body are provided to facilitate predictable opening. The slits are divided into segments connected by bridges to help prevent the slits from separating and the sealing membrane from creeping through the slits prior to rupture. Protective strips adjacent the slits are positioned between the rupture body and the sealing membrane to reduce creep of the membrane through the slits prior to rupture. A vacuum support grid is provided for the panel to support the sealing membrane against a vacuum acting thereon opposite the rupture body.

In the Fons U.S. Pat. No. 4,656,793, a cover plate is retained in a rubber elastic sealing clamping section and is supported by at least one counter support constituted by a lever arm which will be swung from its supporting position when the load limit is exceeded.

A rupture panel in the form of a silo explosion door is disclosed in U.S. Pat. No. 4,750,303. The explosion door serves as a safety protection apparatus to prevent damage resulting from an explosion within a silo from inadvertently generated gaseous pressures.

The Robinson U.S. Pat. No. 4,787,180 provides a vibration resistant rupturable pressure relief member for protecting structure subject to vibration from reaching an overpressure condition. The rupturable pressure relief member is comprised of a rupture panel having an elongated concave-convex bulged portion formed therein and having a score pattern on a side thereof which includes an elongated score extending longitudinally across the bulged portion the ends of which connect with additional divergent scores forming opposing V-shapes.

In U.S. Pat. No. 4,821,909 there is provided a hygienic pressure relief panel unit which is said to reliably rupture at a predetermined pressure in order to prevent buildup of dangerous pressure within protected structure such as a vessel or the like defining an enclosed space, which prevents media passage there through before rupture, and which is supposed to present a sanitary, easily cleanable surface toward the vessel interior in order to inhibit accumulation of food particles, dust or the like. A preferred panel unit includes a slotted stainless steel panel with the slots configured as a line of weakness for separation at a predetermined pressure, a sheet of PTFE material prepared on one side thereof to present an adhesive bonding surface, and an adhesive coupling the sheet and the panel, whereby the panel unit can be placed in a covering relationship with the vent opening of the protected structured in order to present the outer face of the PTFE sheet toward the vessel interior. The panel can include a series of slotted apertures defined there through configured to present a line of weakness, defining three sides of a rectangle. The line of weakness defines the predetermined amount of pressure at which the panel ruptures.

The Short U.S. Pat. No. 5,036,632 discloses a pressure relief panel assembly that includes a single rupture panel which includes a domed portion connected to a peripheral flat flange portion and has at least one slit formed therein defining a hinged blow-out part. The hinged blow-out part is connected to the remaining part of the rupture panel by an unslit hinge area and a plurality of rupture tabs.

A multiple dome single-panel explosion vent is disclosed in the Leonard U.S. Pat. No. 6,070,365. The explosion vent includes a peripheral flange configured for attachment to the enclosure around the opening, a pressure relief panel positioned within and hingedly connected to the flange, and a plurality of connectors or rupture tab assemblies connecting the unhinged portion of the pressure relief panel to the flange. The connectors break when the enclosure is subjected to pressure build-up for permitting the panel to shift outwardly from the enclosure for uncovering the opening in the enclosure. Rivets are provided for attaching the rupture tab assemblies to the pressure relief panel which function to provide additional panel support and minimize localized bending of the rupture tabs forming apart of assemblies when the explosion vent is subjected to vacuum conditions, but do not interfere with rupture of the tabs and opening of the panel at a relatively low burst pressure. The pressure relief panel has a plurality of domed sections presenting at least one valley defining bridge there between. The domed sections and bridges cooperate to stiffen the panel so that it more uniformly distributes force on the connectors, causing all of the connectors to break at approximately the same time so that the panel more consistently opens at a selected burst pressure level.

U.S. Pat. No. 6,367,203 discloses a rupture panel that employs multiple layers including sealing members.

BRIEF SUMMARY OF THE INVENTION

The present invention provides a rupture panel for relieving pressure between the interior of a pressurized vessel and an extension of the vessel. The rupture panel includes multiple layers. A first layer has an adhesive surface with a first area. A second layer has weakened portions (e.g. scoring and/or openings) that define a burst pressure value.

A third layer is a hold down layer that sandwiches the second layer in between the first and the third layer and connecting to the adhesive surface of the first layer.

The second layer has an area that is smaller than the first area. The third layer connects to the first layer at portions of the first layer that are not connected by the second layer. A frame that holds the layers next to the vessel.

In one embodiment, the rupture panel is a foam layer.

In one embodiment, the rupture panel has a periphery and one or more opening next to the periphery.

In one embodiment, the second layer is of a metallic material.

In one embodiment, the second layer has one or more scores that define at least in part the weakened portions.

In one embodiment, the second layer has one or more openings that define at least in part the weakened portions.

In one embodiment, the second layer has opening and scores that define at least in part the weakened portions.

In one embodiment, the first layer has a thickness of between about 1/32 and 1/8 inches.

In one embodiment, the second layer has a thickness of between about 0.020 and 0.125 inches.

In one embodiment, the third layer has a thickness of between about 0.001 and 0.015 inches.

In one embodiment, the second layer has a thickness of between about 0.020 and 0.125 inches.

In one embodiment, the third layer has a thickness of between about 0.001 and 0.015 inches.

In one embodiment, the third layer has a thickness of between about 0.001 and 0.015 inches.

In one embodiment, the third layer has a thickness of between about 0.001 and 0.015 inches.

In one embodiment, the fasteners secure the layers to the frame.

In one embodiment, the fasteners include bolted connections.

In one embodiment, the fasteners include screws.

In one embodiment, the fasteners includes threaded studs.

In one embodiment, the adhesive surface deters lateral movement of one layer in relation to another layer.

In one embodiment, the first layer is at least partially compressed by the frame and fasteners.

In one embodiment, the first layer occupies a first place wherein the first layer engages the second layer and a second plane wherein the first layer engages the third layer.

In one embodiment, a peripheral portion of the first layer extends around the second layer.

In one embodiment, the peripheral portion of the third layer extends around the second layer.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-10 show a preferred embodiment of the apparatus of the present invention, designated generally by the numeral 10 in FIGS. 4-5 and 8-9. Rupture panel apparatus 10 includes three pieces or layers 11, 12, 13. The piece or layer 11 is a lower layer that can be an adhesive backed foam seal layer. Layer or piece 11 can be a closed cell polyethylene foam as an example.

The second piece or layer 12 is a metal membrane. The layer or pieces 12 can be a thin metal membrane with a weakened portion such as scoring, slits, or scores and/or holes that determine the burst pressure of the apparatus. Piece 12 can be a stainless steel layer, such as 316 stainless steel.

The third piece or layer 13 is a hold down ring. The layer or piece 13 is held in place by adhesive from the first layer 11 that is exposed at the perimeter or periphery of the layer or piece 12 or through holes or openings or slots in the layer 12 as seen in FIGS. 4-11.

Figure 3:
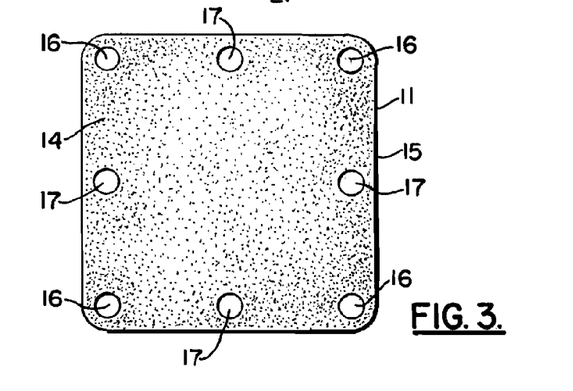
FIG. 3 is a partial plan view of a preferred embodiment of the apparatus of the present invention.
Figure 4:
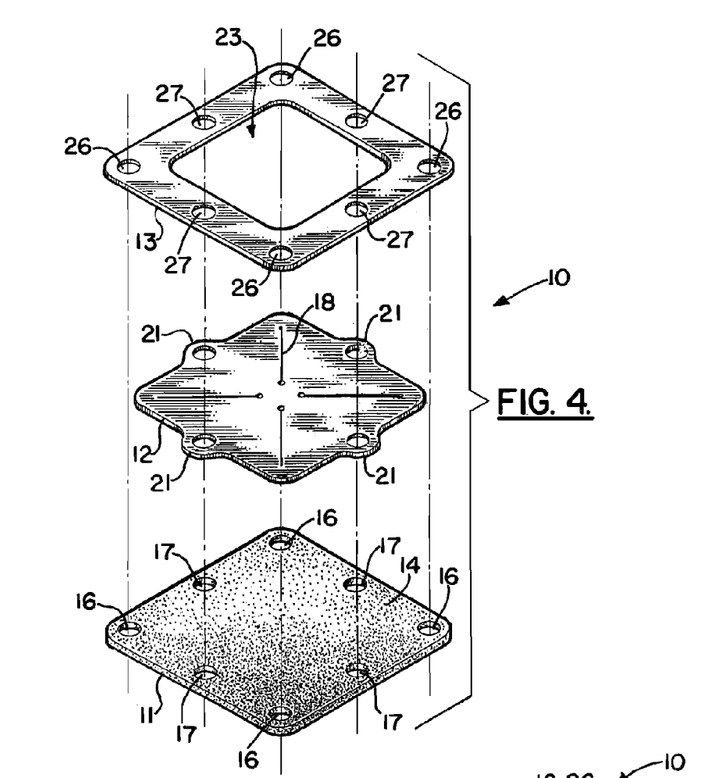
FIG. 4 is a perspective exploded view of a preferred embodiment of the apparatus of the present invention.

Layer 11 can provide an adhesive surface 14. The layer 11 also has a peripheral edge 15. The edge 15 can be generally rectangular or square as shown in FIG. 3. Corner openings 16 are provided at the corners 16 of layer 11 as shown in FIG. 3. Intermediate openings 17 are provided in between each pair of corner openings as seen in FIG. 3.

Figure 2:
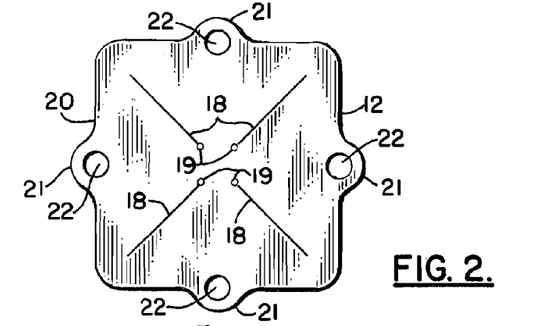
FIG. 2 is a partial plan view of a preferred embodiment of the apparatus of the present invention.

Metal membrane layer 12 has scoring or other weakened portion(s) such as a score or slit 18 or a plurality of scores or slits 18. Openings 19 can be provided in layer 12 as shown in FIG. 2. A combination of scores 18 and openings 19 can be designed to determine the burst pressure of the apparatus 10. The burst pressure can be determined by making the slits longer and/or by making them deeper. Likewise the openings 19 can be made smaller or larger. By varying the length of scores 18, the depth of scores 18 and the diameter of openings 19, a selected burst of pressure can be achieved. Layer 12 has a peripheral edge 20. The peripheral edge 20 includes projecting portions 21. An opening 22 is provided in layer 12 next to each projecting portion 21 as shown.

Figure 1:
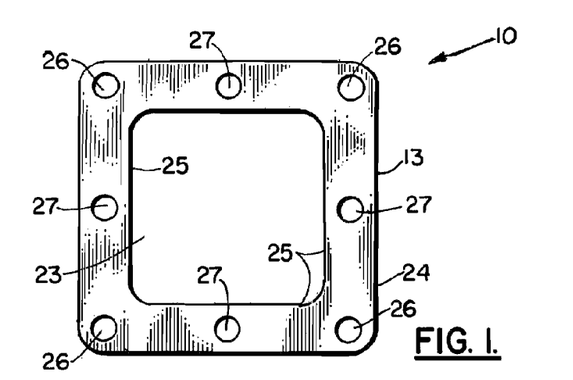
FIG. 1 is a partial plan view of a preferred embodiment of the apparatus of the present invention.

Hold down ring layer 13 has a central opening 23. The layer 13 can be generally rectangular or square as shown in FIG. 1. The opening 23 can be generally square or rectangular as shown in FIG. 1. Layer 13 has a periphery or peripheral edge 24 that is generally square or rectangular. Central opening 23 is defined by inner edge 25 which is generally square or rectangular.

A plurality of corner openings 26 are provided in hold down ring 13. One opening 26 is provided at each corner in FIG. 1. Intermediate openings 27 are provided, one opening 27 in between each pair of corner openings 26 as shown in FIG. 1.

Figure 5:
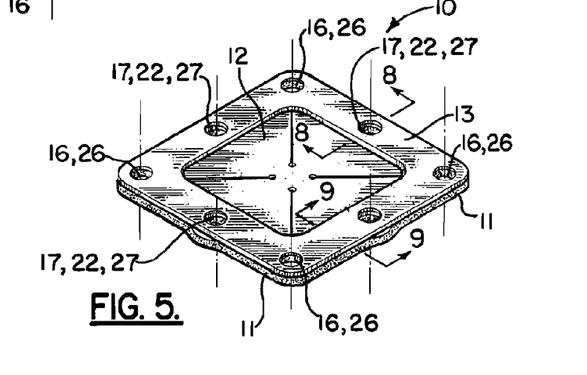
FIG. 5 is a perspective view of a preferred embodiment of the apparatus of the present invention.
Figure 6:
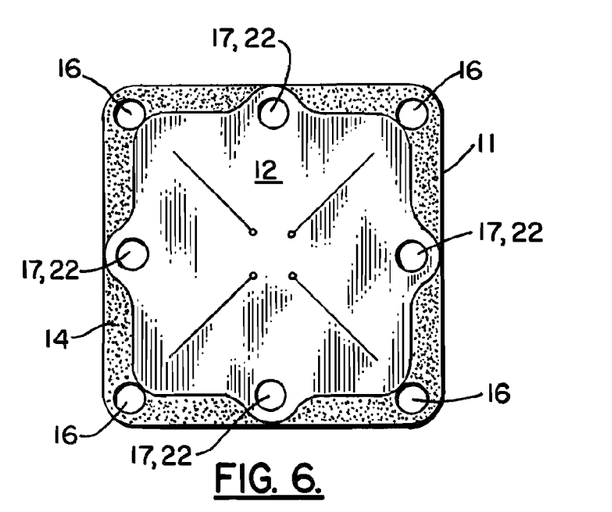
FIG. 6 is a partial plan view of a preferred embodiment of the apparatus of the present invention.
Figure 7:
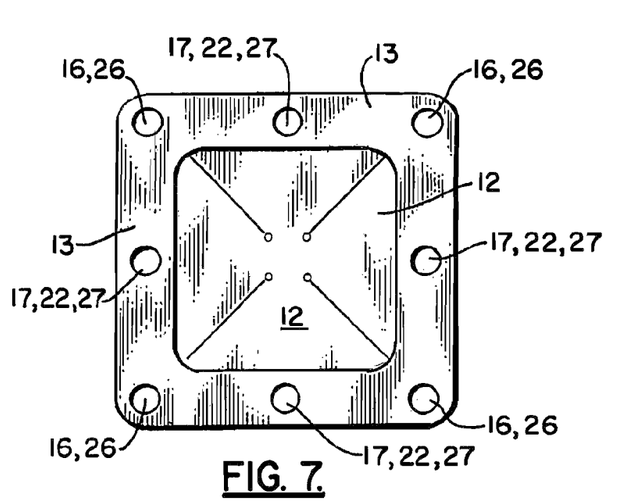
FIG. 7 is a plan view that illustrates assembly of a preferred embodiment of the apparatus of the present invention.
Figure 8:
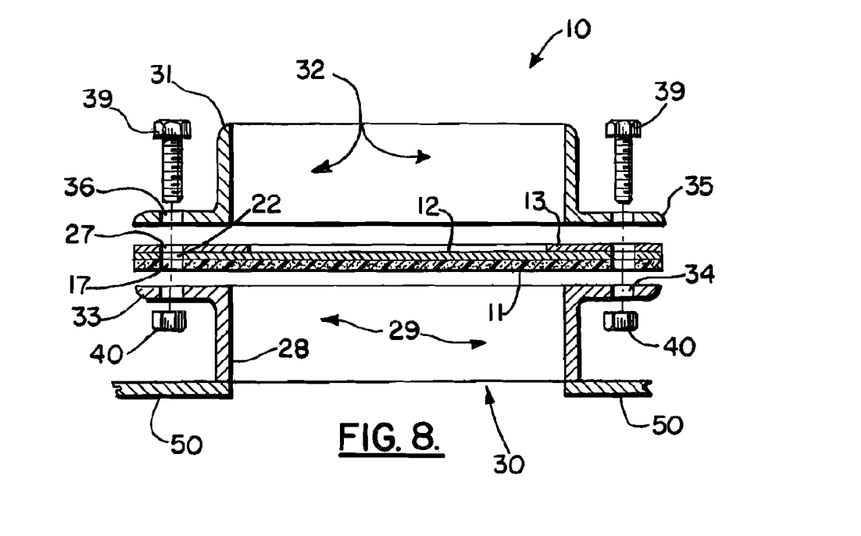
FIG. 8 is a sectional view of a preferred embodiment of the apparatus of the present invention.
Figure 9:
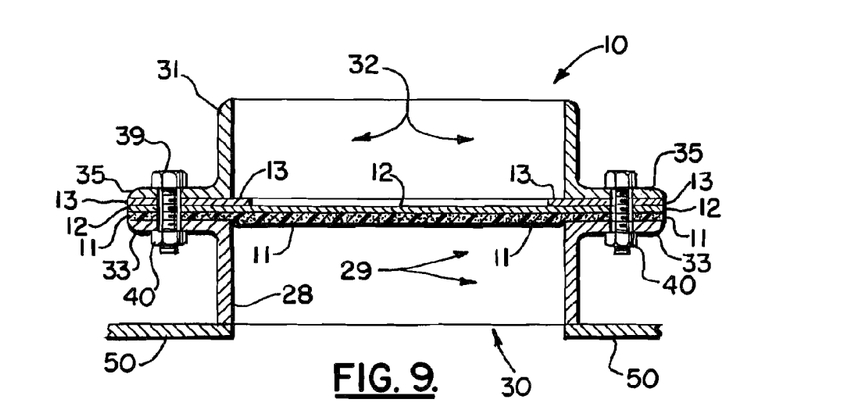
FIG. 9 is a sectional view of a preferred embodiment of the apparatus of the present invention.
Figure 10:
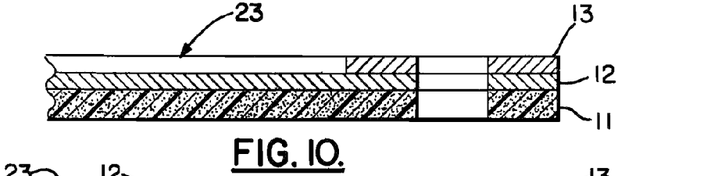
FIG. 10 is a sectional view taken along lines 8-8 of FIG. 5.
Figure 11:
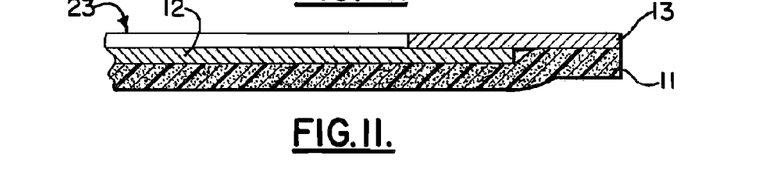
FIG. 11 is a sectional view taken along lines 9-9 of FIG. 5.

When the layers 11, 12, 13 are assembled, openings 16, 26 align as shown in FIGS. 5-7. Similarly, openings 17, 22, 27 align as shown in FIGS. 5-7. In FIGS. 8 and 9, an exemplary instillation is shown wherein the apparatus 10 is installed for controlling excess pressure of a vessel. The vessel 50 has an opening 30. First conduit 28 is attached to vessel 50 at opening 30. Conduit 28 has an opening or bore 29.

Figure 12:
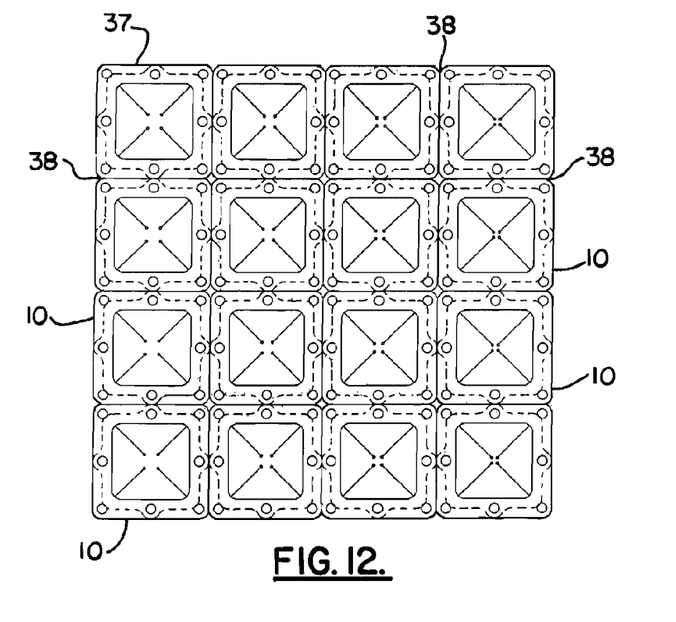
FIG. 12 is a plan view of a preferred embodiment of the apparatus of the present invention.

A second conduit 31 is provided. Each of the conduits 28, 31 provides an opening or bore. The conduit 28 has opening or bore 29. The conduit 31 has opening or bore 32. Each of the conduits 28, 31 can be provided with an angular flange. These angular flanges enable the layers 11, 12, 13 to be clamped together between the angular flanges as shown in FIGS. 8 and 9. Conduit 28 provides angular flange 33 having the flange openings 34 that are receptive of bolted connections or other fasteners. The bolted connections in FIGS. 8 and 9 can be in the form of bolts 39 and nuts 40. The flange openings 34, 36 align for accepting a bolt 39 as shown in FIG. 8. Similarly, the openings 16, 26 align as do the openings 17, 22, 27 for receiving bolts 39 as shown in FIGS. 8 and 9. FIG. 12 illustrates that multiple rupture panels 10 can be manufactured at the same time as part of a sheet 37. In FIG. 12, sixteen rupture panels 10 are shown as manufactured in sheet 37 form. The individual panels 10 can be separated at cut or tear lines 38. To make the sheet 37, a first layer would include sixteen sections of layer 11, sixteen of membrane layers 12 and sixteen hold down ring layers 13.

PARTS LIST

The following is a list of parts and materials suitable for use in the present invention:

| Parts Number | Description |
| --- | --- |
| 10 | rupture panel |
| 11 | adhesive backed seal layer |
| 12 | membrane layer |
| 13 | hold down ring layer |
| 14 | adhesive surface |
| 15 | peripheral edge |
| 16 | corner opening |
| 17 | intermediate opening |
| 18 | score/slit |
| 19 | opening |
| 20 | peripheral edge |
| 21 | projecting portion |
| 22 | opening |
| 23 | central opening |
| 24 | peripheral edge |
| 25 | inner edge |
| 26 | corner opening |
| 27 | intermediate opening |
| 28 | first conduit |
| 29 | opening/bore |
| 30 | vessel opening |
| 31 | wall Second conduit |
| 32 | opening/bore |
| 33 | flange |
| 34 | opening |
| 35 | flange |
| 36 | opening |
| 37 | multiple panel sheet |
| 38 | tear or cut line |
| 39 | bolt |
| 40 | nut |
| 50 | vessel |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. The rupture panel for relieving pressure between the interior of a pressurized vessel and the exterior of the vessel, comprising:
    a) a first layer that has an adhesive surface having a first area;
    b) a second layer that has an area and weakened portions that define a burst pressure value, the area of the second layer being smaller than the area of the first layer;
    c) a third layer that is a hold down layer that sandwiches the second layer in between the first and the third layer layers, the third layer connecting to the adhesive surface of the first layer;
    d) the third layer connecting to the first layer at portions of the first layer that are not connected to the second layer; and
    e) a frame that holds the layers to the vessel.

2. The rupture panel of claim 1 wherein the first layer is a foam layer.

3. The rupture panel of claim 1 wherein the first layer has a periphery and one or more openings next to the periphery.

4. The rupture panel of claim 1 wherein the second layer is of a metallic material.

5. The rupture panel of claim 1 wherein the second layer has one or more scores that define at least in part the weakened portions.

6. The rupture panel of claim 1 wherein the second layer has one or more openings that define at least in part the weakened portions.

7. The rupture panel of claim 1 wherein the second layer has openings and scores that define at least in part the weakened portions.

8. The rupture panel of claim 1 wherein the first layer has a thickness of between about 1/32 and 1/8 inches.

9. The rupture panel of claim 1 wherein the second layer has a thickness of between about 0.020 and 0.125 inches.

10. The rupture panel of claim 1 wherein the third layer has a thickness of between about 0.001 and 0.015 inches.

11. The rupture panel of claim 8 wherein the second layer has a thickness of between about 0.020 and 0.125 inches.

12. The rupture panel of claim 8 wherein the third layer has a thickness of between about 0.001 and 0.015 inches.

13. The rupture panel of claim 11 wherein the third layer has a thickness of between about 0.001 and 0.015 inches.

14. The rupture panel of claim 9 wherein the third layer has a thickness of between about 0.001 and 0.015 inches.

15. The rupture panel of claim 1 wherein fasteners secure the layers to the frame.

16. The rupture panel of claim 15 wherein the fasteners include bolted connections.

17. The rupture panel of claim 1 wherein fasteners include screws.

18. The rupture panel of claim 1 wherein fasteners includes threaded studs.

19. The rupture panel of claim 1 wherein the adhesive surface deters lateral movement of one layer relation to another layer.

20. The rupture panel of claim 15 wherein the first layer is at least partially compressed by the frame and the fasteners.

21. The rupture panel of claim 20 wherein the first layer occupies a first plane wherein the first layer engages the second layer and a second plane wherein the first layer engages the third layer.

22. The rupture panel of claim 1 wherein a peripheral portion of the first layer extends around the second layer.

23. The rupture panel of claim 1 wherein a peripheral portion of the third layer extends around the second layer.

24. The rupture panel of claim 1 further comprising a vessel and said frame mounted to said vessel.

25. The rupture panel for relieving pressure between the interior of a pressurized vessel and the exterior of the vessel, comprising:
  a) a first layer having a first area;
  b) a second layer that has an area, a periphery, and weakened portions that define a burst pressure value, the area of the second layer being smaller than the area of the first layer, the weakened portions being spaced inwardly of said periphery;
  c) a third layer that is a hold down layer that sandwiches the second layer in between the first and the third layer layers, the third layer connecting to the first layer with adhesive;
  d) the third layer connecting to the first layer at portions of the first layer that are outside of the periphery of the second layer; and
  e) a frame that holds the layers to the vessel.

26. The rupture panel of claim 25 wherein the first layer is a foam layer.

27. The rupture panel of claim 25 wherein the first layer has an outer edge and one or more openings next to the outer edge.

28. The rupture panel of claim 25 wherein the second layer is of a metallic material.

29. The rupture panel of claim 26 wherein the second layer has one or more scores that define at least in part the weakened portions.

30. The rupture panel of claim 26 wherein the second layer has one or more openings that define at least in part the weakened portions.

31. The rupture panel of claim 26 wherein the second layer has openings and scores that define at least in part the weakened portions.

* * * * *